United States Patent
Abdel-Mottaleb et al.

(10) Patent No.: US 6,285,995 B1
(45) Date of Patent: Sep. 4, 2001

(54) IMAGE RETRIEVAL SYSTEM USING A QUERY IMAGE

(75) Inventors: Mohammed S. Abdel-Mottaleb; Santhana Krishnamachari, both of Ossining, NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/102,474

(22) Filed: Jun. 22, 1998

(51) Int. Cl.[7] ..................................................... G06F 17/30
(52) U.S. Cl. ........................................ 707/3; 707/2; 707/6
(58) Field of Search ....................... 707/3, 6, 2; 382/229, 382/103; 709/219

(56) References Cited

U.S. PATENT DOCUMENTS

| | | | |
|---|---|---|---|
| 5,742,706 | * 4/1998 | Yu | 382/229 |
| 5,933,823 | * 8/1999 | Cullen et al. | 707/6 |
| 5,983,218 | * 11/1999 | Syeda-Mahmood | 707/3 |
| 6,029,195 | * 2/2000 | Herz | 709/219 |
| 6,134,541 | * 10/2000 | Castelli et al. | 707/2 |
| 6,185,314 | * 2/2001 | Crabtree et al. | 382/103 |

OTHER PUBLICATIONS

Consorti et al. "Knowledge Based Search of Character Strings in Line Drawings", IEEE, 1994, pp. 589–591.*

Langan et al. "Cluster Validation for Unsupervised Stochastic Model–Based Image Segmentation", IEEE, 1994, pp. 197–201.*

John R. Smith & Shih–Fu Change, "Tools and Techniques for Color Image Retrieval"; Proc. SPIE—Int. Soc. Opt. Eng (USA), vol. 2670, pp. 426–437.

Information Theory Coding Theorems, pp. 19–22.

Image Processing, 1998. International Conference on, 1998, pp. 119–122 vol. 3 "Ascalable algorith for image retrieval by color" S. Krishnamachari et al.

* cited by examiner

Primary Examiner—Wayne Amsbury
Assistant Examiner—Thuy Pardo
(74) Attorney, Agent, or Firm—Gregory L. Thorne

(57) ABSTRACT

An image retrieval system contains a database with a large number of images. The system retrieves images from the database that are similar to a query image entered by the user. The images in the database are grouped in clusters according to a similarity criterion so that mutually similar images reside in the same cluster. Each cluster has a cluster center which is representative for the images in it. A first step of the search to similar images selects the clusters that may contain images similar with the query image, by comparing the query image with the cluster centers of all clusters. A second step of the search compares the images in the selected clusters with the query image in order to determine their similarity with the query image.

10 Claims, 4 Drawing Sheets

IMAGE RETRIEVAL SYSTEM USING A QUERY IMAGE

FIELD OF THE INVENTION

The invention generally relates to an image retrieval system. Specifically, the invention relates to an image retrieval system that uses a query image for comparison to a database of candidate images for identifying the candidate image with the largest similarity to the query image.

BACKGROUND OF THE INVENTION

Image retrieval systems are of importance for applications that involve large collections of images. Professional applications include broadcast stations where a piece of a video may be identified through a set of shots and where a shot of video is to be retrieved according to a given image. Also movie producers must be able to find back scenes from among a large number of scenes. Furthermore art museums have large collections of images, from their paintings, photos and drawings, and must be able to retrieve images on the basis of some criterion with respect to their contents. Consumer applications include maintaining collections of slides, photos and videos, from which the user must be able to find back items, e.g. on the basis of similarity with a specified query image.

An image retrieval system and a method as described above, are known from the article "Tools and Techniques for Color Image Retrieval", John R. Smith and Shih-Fu Chang, Proc. SPIE—Int. Soc. Opt. Eng (USA), Vol. 2670, pp. 426–437. The image retrieval system comprises a database with a large number of images. A user searching for a particular image specifies a query image as to how the retrieved image or images should look like. Then the system compares the stored images with the query image and ranks the stored images according to their similarity with the query image. The ranking results are presented to the user who may retrieve one or more of the images. The comparison of the query image with a stored image to determine the similarity may be based on a number of features derived from the respective images. The image feature or features used for comparison are called a feature vector. The article describes the usage of a color histogram as such a feature vector. When using the RGB (Red, Green and Blue) representation of an image, a color histogram is computed by quantizing the colors within the image and counting the number of pixels of each color. To determine the similarity, a number of techniques are described to compare the two color histograms of the respective images. An example of such technique is the histogram intersection, where the similarity is the sum over all histogram bins of the minimal value of the pair of corresponding bins of the two histograms.

In a practical set up, the number of images can be very large. On the Internet for example, the number of images can be of the order of millions and is ever growing. Even if the time to compare the query image with a candidate image is very short, the cumulative time needed to compare the query image with all images in the database will be long. It is a drawback of the known system that a user searching for an image in such a large database must wait a long time after having submitted the query image in the system.

SUMMARY OF THE INVENTION

It is an object of the invention to provide an image retrieval system of the kind set forth in which the time for finding candidate images similar with the query image is reduced. This object is achieved according to the invention in an image retrieval system comprising:

a database with clusters, each cluster comprising a respective set of candidate images and a cluster center which is representative for that set;

entry means for entering a query image;

cluster comparison means for comparing the query image with respective cluster centers to establish respective cluster similarities between the query image and the respective clusters;

selection means for selecting at least the cluster with the largest cluster similarity with the query image;

image comparison means for comparing the query image with the candidate images in the selected clusters to establish respective image similarities between the query image and the respective candidate images; and presentation means for presenting at least the candidate image with the largest image similarity.

By selecting one or more clusters that are most similar with the query image and subsequently comparing the query image with only the candidate images in the selected clusters, fewer comparisons are needed. This reduces the time needed to find the candidate images that are similar with the query image. Since the number of clusters is much smaller than the number of images, the number of additional comparisons for comparing the query image with the clusters is much smaller than the number of saved comparisons because of not comparing the query image with the images in the not selected clusters. Clustering of the candidate images into clusters according to their similarity does not require the presence of any query image. Therefore, the clustering is done in advance and is not done at the time the user is actually searching for images on the basis of the query image. So the time needed to cluster the images does not add to the waiting time the user of the system experiences when searching.

An embodiment of the image retrieval system according to the invention is defined in claim 2. The similarity between images may be determined on the basis of their color histograms. The average of the respective histograms of a number of representative images of a cluster can advantageously be used as a representation for the whole cluster.

It is a further object of the invention to provide a method for retrieving images of the kind set forth with a reduced time for finding candidate images similar with the query image. This object is achieved according to the invention in a method for retrieving images from a database comprising clusters, each cluster comprising a respective set of candidate images and a cluster center which is representative for that set, the method comprising the steps of:

inputting a query image;

comparing the query image with respective cluster centers to establish respective cluster similarities between the clusters and the query image;

selecting at least the cluster with the largest cluster similarity with the query image;

comparing the query image with respective candidate images of the selected clusters to establish respective image similarities between these candidate images and the query image; and presenting at least the candidate image with the largest image similarity. By first determining which of the clusters are similar with the query image and by subsequently comparing the query image with only the images in those clusters, far fewer comparisons are needed. This greatly reduces the time needed to find the candidate images that are similar with the query image.

It is a further object of the invention to provide a method for organizing images in a database, which resulting database allows to find images that are similar with a given query image in a reduced time. This object is achieved according to the invention in a method for organizing images in a database, the method comprising the steps of:

defining clusters each comprising a subset of the images, whereby the images in a cluster are similar with each other and whereby at least one of the clusters comprises more than one image, and determining a cluster center for each of the clusters.

By grouping mutually similar images in respective clusters and by defining respective cluster centers for these clusters, a subsequent search to images that are similar with a given query image can be performed more quickly. The search can first determine on the basis of the cluster centers which of the clusters might contain images that are similar with the query image. Subsequently the search may limit the further comparisons between the query image and the images in the database to these clusters. Consequently fewer comparisons are needed, resulting in a shorter time for finding the similar images.

An embodiment of the method for organizing images in a database according to the invention is defined in claim 5. Determining among all clusters, which two clusters are most similar with each other and by merging these two clusters into a new cluster is a good procedure for creating a database with clusters whereby a cluster comprises mutually similar images. This procedure may be repeatedly executed, each time merging the two most similar clusters into a new cluster and thereby reducing the number of clusters by one, until a required number of clusters has been reached or until the similarity between the two most similar clusters has dropped below a given threshold.

An embodiment of the method for organizing images in a database according to the invention is defined in claim 6. The average of the similarities between all pairs of images in two clusters is a good measure for the similarity between those two clusters, since every image in both clusters contributes to this measure.

An embodiment of the method for organizing images in a database according to the invention is defined in claim 7. When the cluster center of a particular cluster is determined on the basis of a few images of that particular cluster, it is advantageous to select for this purpose respective images from the clusters that were merged into this particular cluster. The fact that these clusters were disjunct at some earlier stage indicates that an image of one of the clusters is less similar with an image of the other cluster than with an image from its own cluster. So selecting an image from each of the clusters gives a better representation of the diversity of the images in the particular cluster that resulted from merging the clusters.

An embodiment of the method for organizing images in a database according to the invention is defined in claim 8. Since the cluster center may be based on only a number of representative images, an image may exist that is more similar with a cluster center of another cluster than with the cluster center of its own cluster. If it is determined that one or more such images exist, then these images are moved to the respective other clusters thus creating an optimized organization of images into clusters with cluster centers. This step of moving the images may be followed by a recomputation of the cluster centers of the clusters involved, i.e. the clusters from which an image is moved and the clusters to which an image is moved, and by again checking whether one or more images exist that are more similar with another cluster center than with its own. These steps may be repeatedly executed until the number of images to be moved is below a given threshold.

It is a further object of the invention to provide a system for organizing images in a database, which resulting database allows to find images that are similar with a given query image in a reduced time. This object is achieved according to the invention in a system for organizing images in a database, the system comprising:

clustering means for defining clusters each comprising a subset of the images, whereby the images in a cluster are similar with each other and whereby at least one of the clusters comprises more than one image, and center determining means for determining a cluster center for each of the clusters.

By grouping mutually similar images in respective clusters and by defining respective cluster centers for these clusters, an organization of the images is made through which a subsequent search to images that are similar with a given query image can be performed more quickly. A first step of the search determines which of the clusters may contain images similar with the query image. Then a second step of the search compares the query image with the images in these clusters. This greatly reduces the number of comparisons needed to find images that are similar with the given query image.

It is a further object of the invention to provide a database with a plurality of images in an organization that allows to find images that are similar with a given query image in a reduced time. This object is achieved according to the invention in a database with a plurality of images, the database comprising:

clusters each comprising a subset of the images, whereby the images in a cluster are similar with each other and whereby at least one of the clusters comprises more than one image, and a cluster center for each of the clusters.

The grouping of mutually similar images in respective clusters and the respective cluster centers for these clusters, make it possible that a subsequent search to images that are similar with a given query image can be performed more quickly.

BRIEF DESCRIPTION OF THE DRAWINGS

The invention and its attendant advantages will be further elucidated with the aid of exemplary embodiments and the accompanying schematic drawings, wherein.

Corresponding features in the various Figures are denoted by the same reference symbols.

DESCRIPTION OF THE PREFERRED EMBODIMENTS

Figure 1:
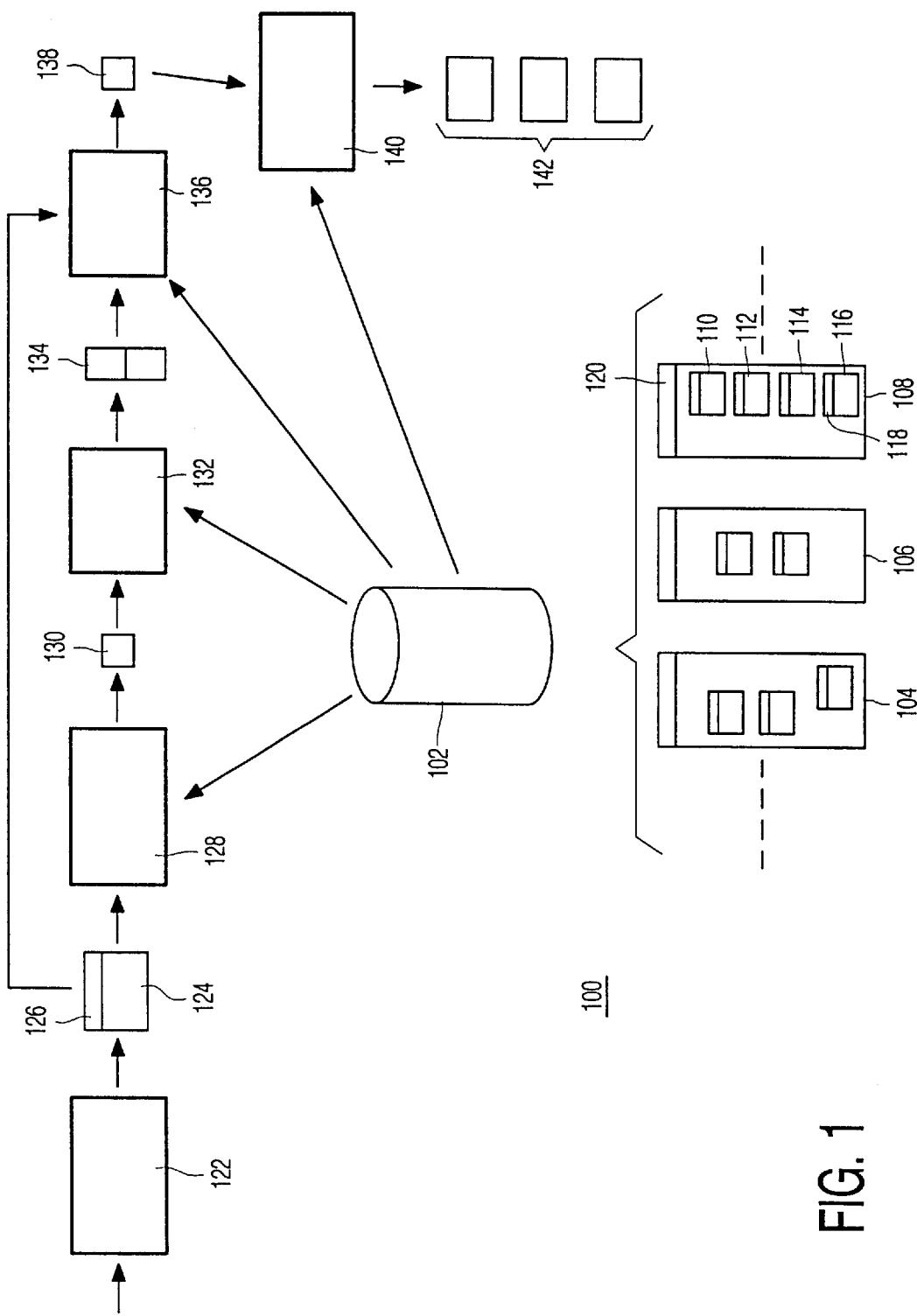
FIG. 1 schematically shows an image retrieval system according to the invention.

FIG. 1 schematically shows an image retrieval system according to the invention. The system 100 comprises a database 102 with a potentially large collection of candidate images. A purpose of the system is to retrieve from the collection one or more images that match the wishes of a user of the system. The system performs a content based search in the collection of the images, i.e. the content of an image is used as the search or ranking criterion, as opposed to systems that search on the basis of keywords in annotation added to the images. The images in the database according to the invention are grouped in clusters, of which clusters 104, 106 and 108 are shown. Images of a cluster are to a certain extent similar with each other. For instance cluster 108 contains images 110, 112, 114 and 116 which are according to a certain measure similar with each other. The content of an image is represented in the system by a socalled feature vector, e.g. image 116 has a feature vector 118. In the system according to the invention, a color histogram of the image is used as feature vector but the type of feature vector is not essential to the invention and other measures expressing the characteristics of the content of an image may be used. The feature vector may be stored in the database with the image itself or at some other location in the database, e.g. in a table with feature vectors of other images including a reference to the image. A cluster has a cluster center representing the contained images, e.g. cluster 108 has cluster center 120. In the system according to the invention, the cluster center is the average of the color histograms of a number of representative images in the cluster. Another kind of cluster center may be used, e.g. the feature vector of a single image which is chosen as the representative image for all images in the cluster.

The system further comprises an entry unit 122 through which the user enters a query image 124. The entry unit may allow the user to compose the query image from a number of existing images or to create the query image from scratch. The entry unit may include a scanning device for producing a digital image from an image available on paper or some other device for producing a digital image. The entry unit determines for the query image 124 a feature vector 126 expressing the contents. In order to determine how similar the query image is with an image in the database, the feature vectors of both images are used to calculate a similarity measure. The system 100 further comprises a cluster comparison unit 128 for comparing the query image 124 with the clusters in the database. For each of the clusters, the cluster comparison unit 128 calculates a cluster similarity 130 on the basis of the feature vector 126 of the query image and the respective cluster center, e.g. 120 of cluster 108. The cluster similarity 130 is a measure how similar the query image is with the particular cluster center and, through that, with the images in that cluster. A selection unit 132 selects on the basis of the calculated cluster similarities 130 a list 134 of clusters with the highest similarity. Experiments have shown that the selection of the 10 most similar clusters out of a total of 133 clusters, with an average of 15 images per cluster, provides for a good overall retrieval accuracy. Subsequently, an image comparison unit 136 compares the query image 124 with each of the candidate images in the selected clusters. For each such candidate image, an image similarity 138 is calculated on the basis of the feature vector 126 of the query image and the feature vector of the particular candidate image.

Finally, the candidate images that are most similar with the query image are presented to the user by a presentation unit 140. The presentation unit 140 presents a list 142 of images ranked with respect to the calculated image similarities 138. Furthermore, it is to be noted that alternative to being determined by the entry unit 122, the feature vector 126 may be determined by the comparison unit 128 or by some other unit specifically arranged for that purpose.

In an embodiment of the image retrieval system according to the invention, the feature vector of an image is its color histogram. The similarity measure between two images is calculated on the basis of the two color histograms of these images by determining the so-called histogram intersection. This technique is described in the article "Tools and Techniques for Color Image Retrieval", John R. Smith and Shih-Fu Chang, Proc. SPIE—Int. Soc. Opt. Eng (USA), Vol. 2670, pp. 426–437.

In a further embodiment an alternative to the histogram intersection technique is used by treating the two histograms as two probability distributions. The question as how similar the two histograms are, can then be answered by measuring how different the one probability distribution is from the other. This difference between two statistical distributions is called informational divergence or Kullback informational divergence and is calculated with the following equation:

$$D(Q\|P) = \sum_{x \in X} Q(x) \log \frac{Q(x)}{P(x)} \quad (1)$$

In which:
 Q(x) is the normalized query color histogram,
 P(x) is the normalized candidate color histogram, and
 D(Q∥P) is the Kullback informational divergence.

A more detailed discussion on the Kullback informational divergence is presented in the textbook "Information Theory: Coding Theorems for Discrete Memoryless Systems", I. Csizar and J. Korner, Akademia Kiado, Budapest, 1981, pages 19–22.

Equation (1) can be rewritten to $$D(Q\|P) = \sum_{x \in X} Q(x) \log Q(x) - \sum_{x \in X} Q(x) \log P(x) \quad (2)$$

The first term in equation (2) is the entropy of distribution Q(x) and is fully determined by the contents of the query. Therefore this first term is the same for all candidate images of the database and need not be considered when raking the candidate images with respect to similarity to the query image. According to this first embodiment of the image retrieval system according to the invention, the similarity between the candidate image and the query image is therefore calculated with the following equation:

$$S_K(Q, P) = \sum_{x \in X} Q(x) \log P(x) \quad (3)$$

In which:
 $S_K(Q,P)$ is the similarity between the candidate image and the query image,
 Q(x) is the normalized query color histogram, and
 P(x) is the normalized candidate color histogram.

The value of $S_K(Q,P)$ is used to rank the candidate images with respect to their similarity with the query image. A relatively large value indicates that two images are similar and a relatively low value indicates that two images are dissimilar.

In a still further embodiment of the image retrieval system according to the invention, similarity coefficients are determined for each pair of corresponding bins of the two color histograms between which a similarity must be determined. Subsequently the obtained collection of similarity coefficients is treated as a probability distribution and the question as how similar the two histograms are, is then answered by analyzing this probability distribution. In this embodiment, the similarity coefficients are calculated using the following equation:

$$r_i(P, Q) = \frac{\min(p_i, q_i)}{\max(p_i, q_i)} \qquad (4)$$

In which:
- $r_i(P,Q)$ is the similarity coefficient between bin i of the candidate color histogram and bin i of the query color histogram,
- $p_i$ is the number of pixels in bin i of the candidate color histogram, and
- $q_i$ is the number of pixels in bin i of the query color histogram.

Especially in cases where the candidate images in the database have significantly different color histograms, comparison on the basis of the similarity coefficients as such is not sufficient. Therefore the distribution of the similarity coefficients over the bins is analyzed. First the distribution is normalized using the following equation:

$$s_i = \frac{r_i}{\sum_{j=0}^{N-1} r_j}; i \in [0, N-1] \qquad (5)$$

In which:
- $s_i$ is an element of the normalized probability distribution S,
- $r_i$ is calculated using equation (4), and
- N is the number of bins.

The flatness of the distribution S is used in addition to the similarity coefficients themselves for determining the similarity between the candidate color histogram and the query color histogram. A flat distribution indicates a good overall match, while one with few peaks indicates a good match over a few bins. The level of flatness of the probability distribution S is measured by calculating its entropy using the following equation:

$$H(S) = -\sum_{j=0}^{N-1} s_j \log(s_j) \qquad (6)$$

In which:
- H(S) is the entropy of distribution S,
- $s_j$ is an element of the distribution S, calculated using equation (5), and
- N is the number of bins.

H(S) lies in the range [0,log(N)]. H(S)=log(N) indicates that the similarity coefficients of all bins are equal, i.e. $r_i$=$r_j$, i,j element of [0,N−1]. The value H(S)=0 indicates that there is at most one histogram bin over which the histograms P and Q are similar. In this embodiment of the image retrieval system according to the invention, the similarity is obtained by combining the entropy H(S) and the sum of the similarity coefficients using the following equation:

$$S_E(P, Q) = H(S) \times \sum_{j=0}^{N-1} r_j \qquad (7)$$

In which:
- $S_E(Q,P)$ is the similarity between the candidate image and the query image,
- H(S) is the entropy according to equation (6), and
- $r_j$ is the similarity coefficient according to equation (4).

$S_E(Q,P)$ lies in the range [0,Nlog(N)]. A larger value of $S_E(Q,P)$ indicates a higher similarity between the candidate color histogram P and the query color histogram Q. If $S_E(Q,P)$=0, P and Q are very dissimilar. If $S_E(Q,P)$=Nlog(N), P and Q are identical.

In the embodiments of the image retrieval system described above, a single color histogram is made from the whole image. Because of this, the spatial information from the image is lost and the comparison of two images reflects only global similarity. For example if a user enters a query image with a sky at the top and sand at the bottom, the retrieved images are expected to have a mix of blue and beige, but not necessarily a sky and sand. A desirable result for the retrieved candidate images would be images with blue at the top and beige at the bottom. In order to achieve this result, a further embodiment of the system according to the invention determines a color histogram for a number of respective regions of the query image and compares these determined histograms with histograms of corresponding regions of the candidate image. The query image may be divided into regions using prefixed boundaries, e.g. the division of the image into a number of rectangles. Furthermore, the regions may be indicated manually by the user taking into account important objects in the query image. In this way, the user forces that a histogram is made for a region comprising the object of interest. The choice of the region size is important since it governs the emphasis that is given to local information. In one extreme, the whole image is considered as a single region so that only global information is used for the comparison. In the other extreme, the region size matches the individual pixels. In one of the further embodiments of the retrieval system according to the invention, the images are divided into 4×4 rectangular regions.

Combining the region similarities corresponding to the respective regions of the query image and the candidate image into an overall similarity should avoid that too much emphasis is put on any one the region similarities. Therefore, the embodiments of the system according to the invention with multiple color histograms per image use the median of the region similarities as a measure of the similarity for the whole image. In the embodiment of the system using the Kullback informational divergence, the overall similarity between the candidate image and the query image, based on similarities of respective regions of the images is calculating according to the following equation:

$$\hat{S}_K(I_Q, I_P) = \underset{(k, l \in [0, M-1])}{\text{Median}} \{S_k(Q_{kl}, P_{kl})\} \qquad (8)$$

In which:
- $I_Q$ is the query image,
- $I_P$ is the particular candidate image,
- $\hat{S}_K(I_Q, I_P)$ is the overall similarity between image P and Q,
- $Q_{kl}$ is the color histogram of region k,l of the query image, $P_{kl}$ is the color histogram of region k,l of the particular candidate image, $S_K(Q_{kl}, P_{kl})$ is the similarity between region k,l of the candidate image and region k,l of the query image, based on the Kullback informational divergence according to equation (3), and M is the number of regions into which the image is divided in the horizontal and in the vertical direction.

The median function sorts the individual region similarities and selects the middle one to be the overall similarity, In the embodiment of the system using the entropy measure, the overall similarity between the candidate image and the query image, based on similarities of respective regions of the images is calculated according to the following equation:

$$\hat{S}_E(I_Q, I_P) = \underset{(k, l \in [0, M-1])}{\text{Median}}\{S_E(Q_{kl}, P_{kl})\} \qquad (9)$$

In which:

$I_Q$ is the query image, $I_P$ is the particular candidate image, $\hat{S}_E(I_Q, I_P)$ is the overall similarity between image P and Q.

$Q_{kl}$ is the color histogram of region k,l of the query image, $P_{kl}$ is the color histogram of region k,l of the particular candidate image, $S_E(Q_{kl}, P_{kl})$ is the similarity between region k,l of the candidate image and region k,l of the query image, based on the entropy measure according to equation (7), and M is the number of regions into which the image is divided in the horizontal and in the vertical direction.

The images in the database of the retrieval system according to the invention are organized into clusters so as to allow a search to images similar with a given query image without the need of comparing all images with the query image. According to the invention, clusters of images are defined whereby similar images are grouped in a same cluster and a cluster center is defined for such cluster which is representative of the images in the cluster. In an embodiment of the method of organizing the images in the database according to the invention, the images are clustered in a hierarchical way. The number of images in the database is n and the similarities between all pairs of images is precomputed. The calculation of the similarities between the candidate images in the database is carried out using the same feature vector described above for the calculation of the similarity between the query image and a candidate image, namely the color histograms of the relevant images. However, a different type of feature vector may be used since the process of clustering the images in the database is not directly linked to the process of searching the database. The hierarchical clustering is carried out as follows:

1. The n images in the database are placed in n distinct clusters, these clusters are called leaf clusters and are indexed by $\{C_1, C_2, \ldots, C_n\}$. For the kth cluster, the set $E_k$ contains all the images contained in that cluster. For all leaf clusters, $E_k = \{k\}$ and the number of images is $N_k = 1$.
2. Two clusters $C_k$ and $C_l$ are selected for which the similarity with one another is the largest. The calculation of the similarity between two clusters is described below.
3. These two clusters are merged into a new cluster $C_{n+1}$. This reduces the number of clusters by one. The set of images in this new cluster becomes $E_{n+1} = \{E_k \cup E_l\}$ and the number of images in this new cluster becomes $N_{n+1} = N_k + N_l$.
4. Steps 2 and 3 are repeated until the number of clusters has been reduced to a required number $n_c$ or the largest similarity between the clusters has dropped below a predetermined threshold.

Figure 2:
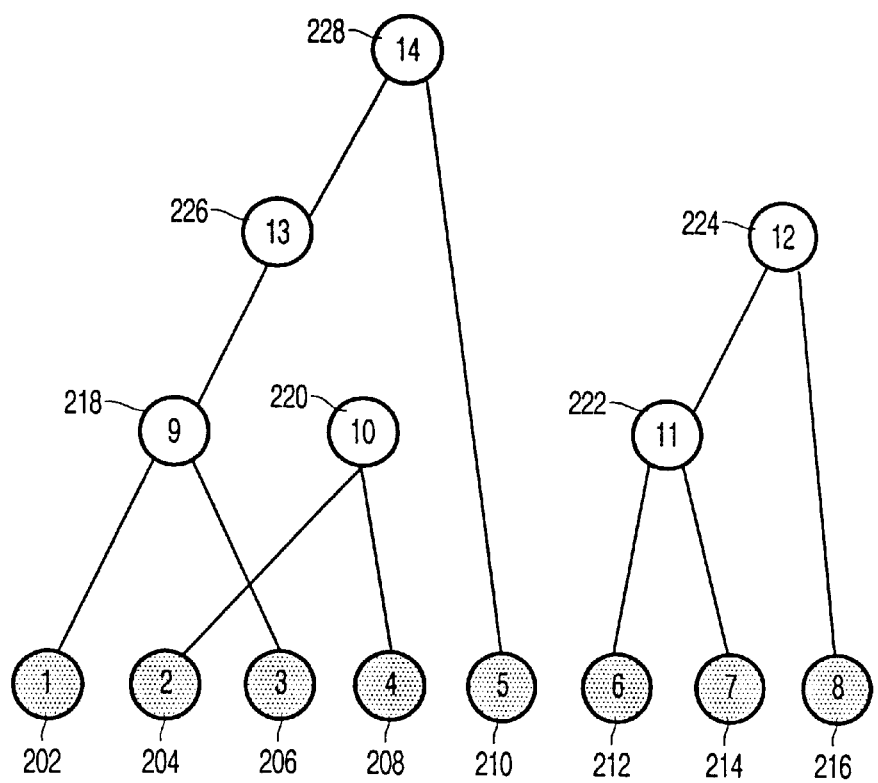
FIG. 2 shows a simple example of organizing images into clusters according to the invention.

FIG. 2 shows a simple example of organizing images into clusters according to the invention. The database contains 8 images, images 202–216. In step 1, these images are put in 8 distinct clusters. In a first execution of step 2, out of all pairs from among the 8 clusters, cluster 202 and cluster 206 appear to be the most similar with each other, These two clusters are merged into a new cluster 218 in step 3. This results in a situation with 7 clusters, namely clusters 218, 204, 208, 210, 212, 214 and 216. After a second execution of step 2, it appears that from among all pairs of these 7 clusters, cluster 204 and cluster 208 have the highest similarity. These are merged into new cluster 220. In repeated steps 2 and 3, then clusters 212 and 214 are merged into cluster 222, cluster 222 and cluster 216 are merged into cluster 224, and cluster 218 and cluster 220 are merged into cluster 226. This results in a structure with 3 different clusters: cluster 226, cluster 210 and cluster 224. Then in a last execution of step 2, it is established that clusters 226 and 210 have the highest similarity among these 3 clusters and are therefore merged into a new cluster 228. The process of clustering is now stopped since it has reached a number of two distinct clusters, which was the required number $n_c$ in this example. For this example $N_{14} = 5$, $N_{12} = 3$, $E_{14} = \{1,2,3,4,5\}$ and $E_{12} = \{6,7,8\}$.

In another embodiment of the method according to the invention, an alternative clustering technique is chosen. This alternative clustering is carried out as follows:

1. The number of clusters $n_c$ is chosen a priori. The $n_c$ centers are chosen by randomly picking $n_c$ images from the database.
2. For each image in the database, the similarity measure between the image and the cluster centers are computed and the image is assigned to the cluster with which it exhibits the largest similarity measure.
3. New cluster centers are computed as the centroids of the clusters.
4. Steps 2 and 3 are repeated until there is no further change in the cluster centers.

In an embodiment of the method for organizing images according to the invention, the measure of similarity between two clusters $C_k$ and $C_l$ is defined in terms of the similarity measures of the images that are contained in those clusters using the following equation:

$$S_{k,l} = \frac{\sum_{i,j \in \{E_l \cup E_k\}, i \neq j} s_{i,j}}{P_{(Nk+Nl)}} \qquad (10)$$

In which:

$S_{k,l}$ is the similarity measure between the clusters $C_k$ and $C_l$, $E_k$ is the set of images in cluster $C_k$, $E_l$ is the set of images in cluster $C_l$, $s_{i,j}$ is the similarity measure between two images i and j, and $P_{(Nk+Nl)}$ is the number of pairs of images in the combination of clusters $C_k$ and $C_l$.

So $S_{k,l}$ is defined to be the average similarity between all pairs of images that will be present in the cluster obtained by merging $C_k$ and $C_l$. This ensures that when two clusters are merged, the resulting cluster has the largest similarity between all images in those two clusters. Since the similarity between clusters is defined in terms of the similarity measures between the images in the clusters, there is no need to compute the cluster centers every time two clusters are merged.

The number $P_n$ of pairs of images in a cluster with n images is calculated using the following equation:

$$P_n = (n-1)\frac{n}{2} \quad (11)$$

When two clusters $C_l$ and $C_k$ are merged into a new cluster $C_m$, the it is necessary to calculate the similarity of this cluster with all other clusters. This can be done using equation (10). However, this calculation is computational intensive and a faster, recursive calculation can be done. For any given cluster $C_t$, the similarity between the cluster $C_m$ and the cluster $C_t$ is recursively calculated using the following equation:

$$S_{m,t} = \frac{P_{(N_l+N_k)}S_{l,k} + P_{(N_l+N_t)}S_{l,t} + P_{(N_k+N_t)}S_{k,t} - P_{N_l}S_{l,l} - P_{N_k}S_{k,k} - P_{N_t}S_{t,t}}{P_{(N_l+N_k+N_t)}} \quad (12)$$

In which:

$S_{m,t}$ is the similarity measure between the clusters $C_m$ and $C_t$, $P_x$ is the number of pairs of images from among x images.

At the beginning of the clustering, for all leaf clusters $S_{i,j}$ is set equal to $s_{i,j}$ and $S_{i,i}$ is set equal to zero.

In the above embodiment of the method for organizing images according to the invention, the cluster center of a cluster is defined as the average of the color histograms of a number representative images in that cluster. These images are selected in such a way that the cluster center computed from them is close to all the images in the cluster. The tree structure that was obtained as a by-product of the hierarchical clustering algorithm is effectively used to select the set of representative images. In the explanation below, a subcluster is a cluster that has been merged with another cluster to form part of a resulting, larger cluster. In the example of FIG. 2, the representative images for cluster $C_{14}$ are selected with the following considerations. From the tree structure it can be inferred that the images 1 and 3 belong to one subcluster and images 2 and 4 belong to another subcluster. Hence a good selection of representative images, if the number r of representative images is 3, is to select one from {1,3}, another from {2,4} and 5. If the number r=2, then it is apt to select one from {1,2,3,4} and 5 as representative images. Similarly for $C_{12}$, it is better to select 6 and 8 or 7 and 8 instead of 6 and 7. A selection according the above considerations results in a representative set that captures the diversity of images present in a cluster.

In general, for a cluster $C_i$ a representative set of r images is selected as described hereafter. A set of r subclusters is chosen from the tree associated with $C_i$ and from each of these subclusters a representative image is selected, resulting in r representative images. This procedure includes the following steps:

1. et n=0 and form a set $R_n=\{i\}$. If r=1, then go to step 5.
2. Each element in $R_n$ is an index of a subcluster. Find an element k such that $N_k$ is the largest, i.e. find the subcluster at the next level of the hierarchy with the largest number of images in it.
3. Form a new set $R_{n+1}$, by copying all the elements of $R_n$ except k and adding the right child of $C_k$ a and the left child of $C_k$.
4. Repeat steps 2 and 3 until the number of elements contained in $R_n$ is equal to r.
5. Now $R_n$ contains r subclusters from the tree associated with $C_i$. From each of these subclusters a representative image is chosen. If k is an element of $R_n$, and $C_k$ is a leaf cluster, then $N_k=1$ and the selection is straightforward, i.e. the image associated with the leaf is selected. If $C_k$ is not a leaf, i.e. $N_k>1$, then it is necessary to select a single image from $E_k$. This is done by selecting the one that has the maximum average similarity measure with the other $N_k-1$ images of $E_k$.

For the example shown in FIG. 2, finding a representative set of images for $C_{14}$ with r=2, begins with $R_0=\{14\}$ and $R_1=\{13,5\}$ and the iteration stops here as $R_1$ contains two elements already. Now, since $C_5$ is a leaf cluster with a single element, image 5 is chosen as one representative. Another representative is selected from $C_{13}$ that contains four images {1,2,3,4} by calculating the average similarity of each image with the other three images and then choosing the one with the maximum average similarity. Assuming that image 2 has the largest average similarity, the representative set of images for cluster $C_{14}$ is {2,5}. After selecting a set of r representative images, the averages of their corresponding histograms are used to represent the cluster center. In the embodiment of the invention where multiple histograms per image are employed, i.e. a histogram per region of an image in order to capture spatial information, the cluster center is represented by multiple histograms which are obtained by averaging the corresponding regions of the representative images. So, if in the example above the image would be divided into 16 regions, the cluster center for $C_{14}$ is represented by 16 histograms which are obtained by averaging the corresponding histograms of the regions of images 2 and 5.

A cluster center can be computed for each of the clusters, not being a subcluster, to represent the images in the cluster. After computing the cluster center, the optimality of the clustering and the computation of clusters is evaluated. Cluster centers are optimal, if for each image contained in a cluster, the similarity measure between the image and that cluster is larger than the respective similarity measures between the image and all other cluster centers. This may not be true, especially given the fact that only a representative set of images is used to compute the clusters centers and not all the images in the cluster. As a result of that, an image may have a larger similarity measure with another cluster center than with its own cluster center. All such images are moved to their closest clusters to optimize the cluster centers. This cluster center optimization is carried out as follows:

1. For each of the n images in the database, the similarity measures between the image and all cluster centers is determined. If the cluster with the maximum similarity is the same cluster in which the image is present then nothing is done. If not, the image is moved from the cluster in which it resides to the cluster that it is most similar to. The trees of boffi clusters are rearranged to reflect this removal and addition as described below.
2. The cluster centers of the relevant clusters are recomputed. These are the cluster from which an image has been removed or to which an image has been added.
3. Steps 1 and 2 are repeated until the number of images to be moved is below a threshold. Then, these images are moved as in step 1 and the cluster centers are not recomputed as in step 2.

At the end of step 3, all images exhibit the largest similarity measure with the center of the cluster in which they are present and hence the clustering is optimal.

Figure 3:
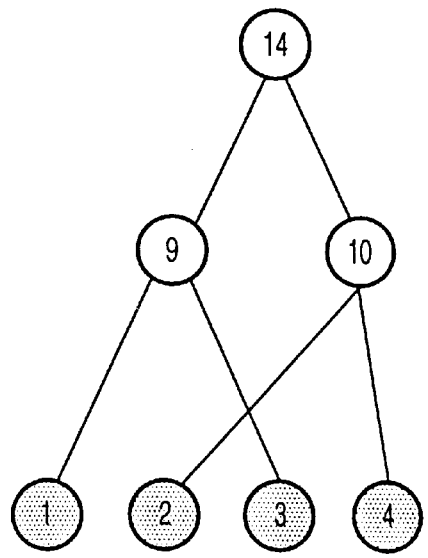
FIG. 3 shows an example of the removal of an image which is a direct child of the root of the cluster.
Figure 4:
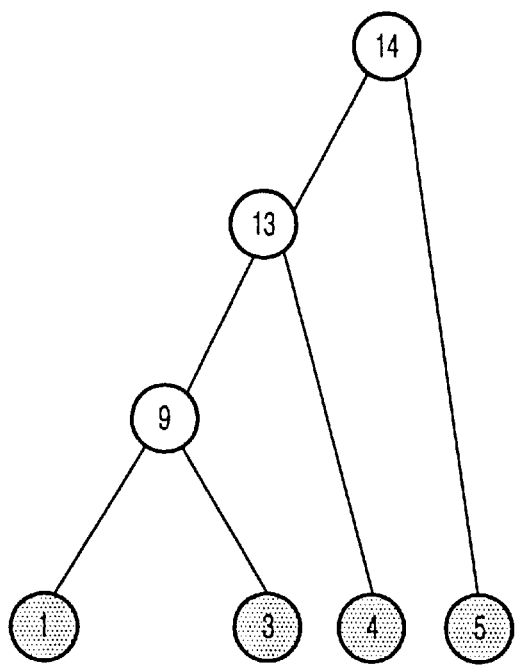
FIG. 4 shows an example of the removal of an image which is not a direct child of the root.

When an image is removed from a cluster, the associated tree of subclusters and images is updated. When an image is removed, there are two possible scenarios depending on whether the removed node is a direct child of the root of the cluster or not. FIG. 3 shows an example of the removal of an image which is a direct child of the root of the cluster. This shows the removal of image 5 in the example cluster of FIG. 2. When image 5 is removed, the node 13 becomes redundant and hence it is removed and replaced with node 14. Now $N_{14}=4$, $E_{14}=\{1,2,3,4\}$, the right child $RC_{14}=10$ and left child $LC_{14}=9$. FIG. 4 shows an example of the removal of an image which is not a direct child of the root. This shows the removal of image 2 in the example cluster of FIG. 2. When image 2 is removed, node 10 will have only one child and hence it is removed. Image 4 then becomes a child of node 13. Now $N_{13}=3$, $E_{13}=\{1,3,4\}$, the right child $RC_{13}=4$ and the left child $LC_{13}=9$. And for $C_{14}$, $N_{14}=4$, $E_{14}=\{1,3,4,5\}$, the right child $RC_{14}=5$ and the left child $LC_{14}=13$.

Figure 5:
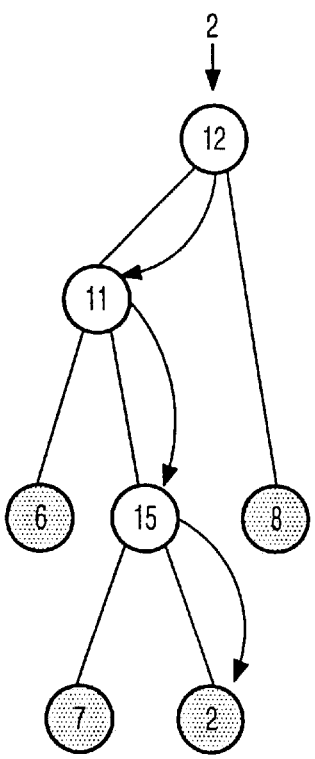
FIG. 5 shows an example of the addition of an image to a cluster.

FIG. 5 shows an example of the addition of an image to a cluster. When adding the image to a cluster, it is necessary to decide where to insert it as a new node in the tree. This decision is made top-to-bottom. If an image is to be added to cluster $C_k$ with right child $C_i$ and left child $C_j$, then first $E_k$ and $N_k$ are updated to reflect the addition of the node to the tree of $C_k$. The decision of whether to add the image to $C_i$ or $C_j$ is based on the similarity measure. The image is added to $C_i$, if the average similarity of the image with all the images in $C_i$ is larger than the average similarity of the image with all the images in $C_j$ and vice versa. If the node is added to $C_i$, the parameters associated with $C_i$ are updated. The image is then added to either the right or left child of $C_i$. This process is repeated recursively until the leaves of the tree are reached. FIG. 5 shows the addition of image 2 to cluster $C_{12}$ of FIG. 2. First the parameters associated with $C_{12}$ are update, $N_{12}=4$ and $E_{12}=\{6,7,8,2\}$. Then to decide whether the image 2 is to be added to $C_{11}$ or $C_8$, the similarity measure $s_{2,8}$ is compared with $(s_{2,6}+s_{2,7})/2$. If the latter is larger, then $E_{11}$ s updated to $\{6,7,2\}$ and $N_{11}$ is updated to 3. Then $s_{2,6}$ and $S_{2,7}$ are compare and if $s_{2,7}$ is larger, a new node $C_{15}$ is created with right child $RC_{15}=2$ and left child $LC_{15}=7$. Also the right child of $C_{11}$ is updated, $RC_{11}=15$.

Figure 6:
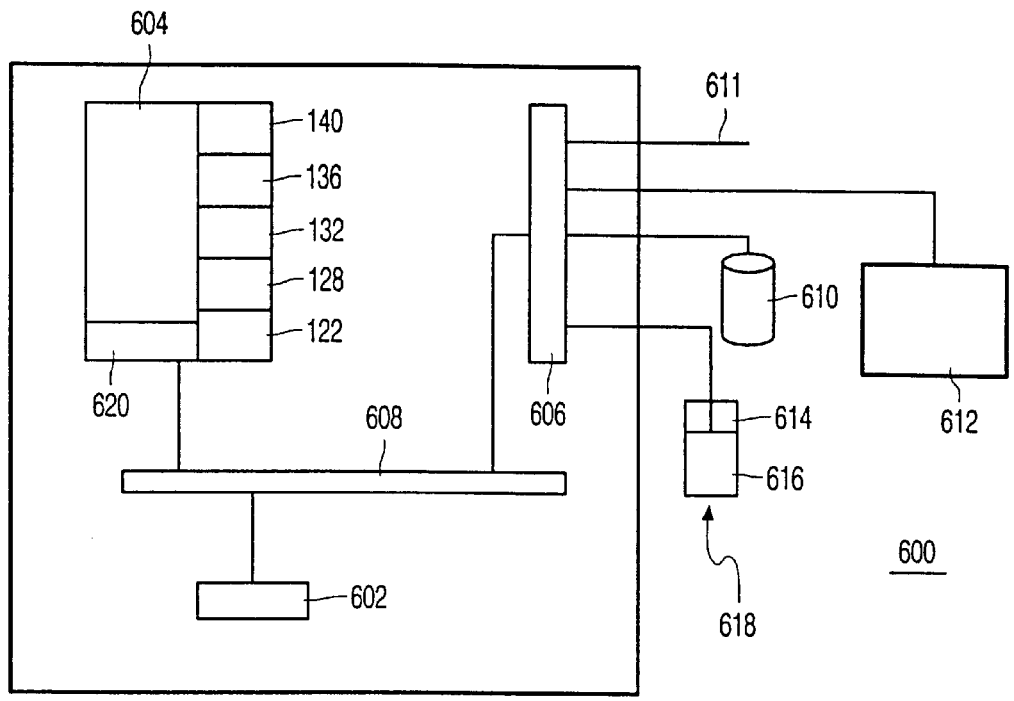
FIG. 6 shows the most important components of the image retrieval system according to the invention.

FIG. 6 shows the most important components of the image retrieval system according to the invention. The image retrieval system 600 is implemented according to a known architecture and can be realized on a general purpose computer. The image retrieval system has a processor 602 for carrying out instructions of an application program loaded into working memory 604. The image retrieval system further has an interface 606 for communication with peripheral devices. There is a bus 608 for exchange of commands and data between the various components of the system. The peripherals of the image retrieval system include a storage medium 610 containing the executable programs, the database with images, and various other data. The storage medium 610 can be realized as various separate devices, potentially of different kind of storage device. Application of the invention is not restricted by the type of device and storage devices which can be used include optical disc, magnetic disc, tape, chip card, solid state or some combination of these devices. Furthermore, some of the data or images may be at a remote location and the image retrieval system may be connected to such a location by a network via connection 611. The peripherals of the image retrieval system further include a display 612 on which the system displays, amongst others, the query image and the candidate images. Furthermore the peripherals preferably include a selection device 614 and a pointing device 616 with which the user can move a cursor on the display. Devices 614 and 616 can be integrated into one selecting means 618 like a computer mouse with one or more selection buttons. However, other devices like a track ball, graphic tablet, joystick, or touch sensitive display are also possible. In order to carry out the various tasks, a number of software units are loaded into the working memory 604. An entry unit 122 enables the user to enter the query image into the system. A cluster comparison unit 128 is arranged for comparing the query image with the cluster centers of the clusters with images and for computing respective cluster similarities. The selection unit 132 is arranged to select the clusters of which the cluster centers exhibit the highest similarity with the query image. The image comparison unit 136 is for comparing the query image with the images in the selected clusters and for computing the image similarities between the query image and those images. The presentation unit 140 is arranged for presenting the images in a ranked order with respect to their image similarity, a so that the user is shown the images with the highest image similarity first. The distribution of the system's functionality over the various software unit may be implemented in a different way than as described above. Some unit may be combined or other units may be used to realize a certain task. Furthermore, the working memory 604 has memory space 620 for temporarily storing input and output data and intermediate results, like the respective histograms and the determined similarity.

Figure 7:
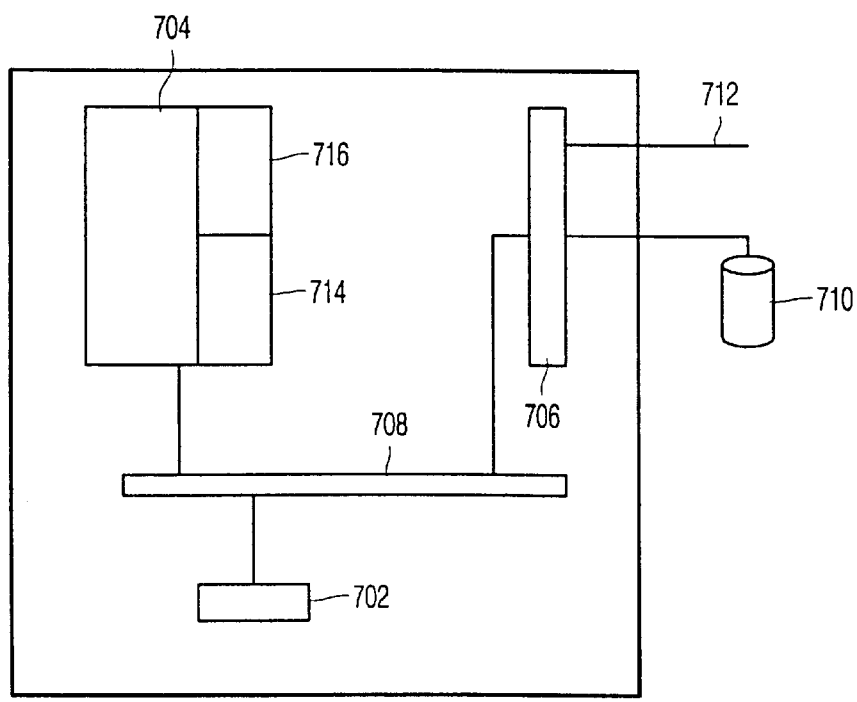
FIG. 7 shows the most important components of the system for organizing the images according to the invention.

FIG. 7 shows the most important components of the system for organizing the images according to the invention. The system 700 for organizing the images is implemented according to a known architecture and can be realized on a general purpose computer. The system 700 has a processor 702 for carrying out instructions of an application program loaded into working memory 704. The system 700 further has an interface 706 for communication with peripheral devices. There is a bus 708 for exchange of commands and data between the various components of the system. The peripherals of the image retrieval system include a storage medium 710 containing the executable programs, the database with images, and various other data. The storage medium 710 can be realized as various separate devices, potentially of different kind of storage device. Application of the invention is not restricted by the type of device and storage devices which can be used include optical disc, magnetic disc, tape, chip card, solid state or some combination of these devices. In an embodiment of the system for organizing images according to the invention, the images that are to be organized reside on a hard disk and the resulting database also resides on this hard disk. However, the images may be transferred into the system in another way, e.g. via a tape. Furthermore, some of the data or images may be at a remote location and the system may be connected to such a location by a network via connection 712. The system 700 has a clustering unit 714 loaded into the working memory for defining the clusters whereby mutually similar images are grouped into a same cluster. Furthermore, the system 700 has a center determining unit 716 for determining the cluster centers for the respective clusters.

What is claimed is:

1. An image retrieval system comprising:
   a database with clusters, each cluster comprising a respective set of candidate images and a cluster center which is representative for that set;
   entry means for entering a query image;
   cluster comparison means for comparing the query image with respective cluster centers to establish respective cluster similarities between the query image and the respective clusters;

selection means for selecting at least the cluster with the largest cluster similarity with the query image;

image comparison means for comparing the query image with the candidate images in the selected clusters to establish respective image similarities between the query image and the respective candidate images wherein the cluster centers are not selected from the resepective candidate images; and presentation means for presenting at least the candidate image with the largest image similarity.

2. An image retrieval system according to claim 1, in which at least one of the cluster centers is represented by a color histogram which is the average of respective color histograms of a number of representative images in the particular cluster.

3. A method for retrieving images from a database comprising clusters, each cluster comprising a respective set of candidate images and a cluster center which is representative for that set, the method comprising the steps of:

calculating an average for each of the clusters as the respective cluster center;

inputting a query image;

comparing the query image with respective cluster centers to establish respective cluster similarities between the clusters and the query image;

selecting at least the cluster with the largest cluster similarity with the query image;

comparing the query image with respective candidate images of the selected clusters to establish respective image similarities between these candidate images and the query image; and presenting at least the candidate image with the largest image similarity.

4. A method for organizing images in a database, the method comprising the steps of:

defining clusters each comprising a subset of the images, whereby the images in a cluster are similar with each other and whereby at least one of the clusters comprises more than one image, and determining a cluster center for each of the clusters, wherein the cluster centers are not selected from the respective images.

5. A method according to claim 4, further comprising the step of determining the similarity between each respective cluster and each other one of the clusters, wherein the step of defining the cluster includes merging the two clusters with the largest mutual similarity into one new cluster, and the step of determining a cluster center includes determining an average from the respective subset of images as a cluster center for the new cluster.

6. A method according to claim 5, wherein the similarity between two clusters is determined on the basis of the average of the similarities between all pairs of as images in the two clusters.

7. A method according to claim 5, wherein the cluster center of the new cluster is determined on the basis of images selected from respective ones of the two clusters that had been selected for merging into the new cluster.

8. A method according to claim 4, further comprising a cluster center optimization step including:

determining the similarity between at least one of the images and each of the cluster centers and if that image has a larger similarity with the cluster center of another cluster than with the cluster center of its own cluster, moving that image to that other cluster.

9. A system for organizing images in a database, the system comprising:

clustering means for defining clusters each comprising a subset of the images, whereby the images in a cluster are similar with each other and whereby at least one of the clusters comprises more than one image, and center determining means for determining a cluster center for each of the clusters by determining average image values from the images in the cluster.

10. A database with a plurality of images, the database comprising:

clusters each comprising a subset of the images, whereby the images in a cluster are similar with each other and whereby at least one of the clusters comprises more than one image, and a cluster center for each of the clusters representing average image values of the respective subset of images.

* * * * *